(12) United States Patent
Wang et al.

(10) Patent No.: US 10,384,418 B2
(45) Date of Patent: Aug. 20, 2019

(54) ARTICLES INCLUDING UNTWISTED FIBERS AND METHODS OF USING THEM

(71) Applicants: Ruomiao Wang, Forest, VA (US); Jesse Hipwell, Grand Blanc, MI (US); Mark Mason, Covington, VA (US); Thomas A Ebeling, Forest, VA (US); Erich Vorenkamp, Pinckney, MI (US); Stephen Senkow, Emmett, MI (US)

(72) Inventors: Ruomiao Wang, Forest, VA (US); Jesse Hipwell, Grand Blanc, MI (US); Mark Mason, Covington, VA (US); Thomas A Ebeling, Forest, VA (US); Erich Vorenkamp, Pinckney, MI (US); Stephen Senkow, Emmett, MI (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 14/092,038

(22) Filed: Nov. 27, 2013

(65) Prior Publication Data
US 2014/0162020 A1     Jun. 12, 2014

Related U.S. Application Data

(60) Provisional application No. 61/734,715, filed on Dec. 7, 2012, provisional application No. 61/782,129, filed on Mar. 14, 2013.

(51) Int. Cl.
*B32B 5/12*   (2006.01)
*B32B 17/02*  (2006.01)
(Continued)

(52) U.S. Cl.
CPC .............. *B32B 5/12* (2013.01); *B32B 5/02* (2013.01); *B32B 5/22* (2013.01); *B32B 5/26* (2013.01);
(Continued)

(58) Field of Classification Search
CPC .. B32B 17/02; B32B 5/12; B32B 5/24; B32B 2260/046; B32B 2262/101;
(Continued)

(56) References Cited

U.S. PATENT DOCUMENTS 4,692,375 A   9/1987   Neubauer
4,767,321 A   8/1988   Chilva
(Continued)

FOREIGN PATENT DOCUMENTS

WO   2009147633   12/2009

OTHER PUBLICATIONS

Astrom ("Manufacturing of Polymer Composites" 1997, p. 118-121).*

(Continued)

*Primary Examiner* — Travis M Figg
(74) *Attorney, Agent, or Firm* — Rhodes IP PLC; Christopher R Rhodes

(57) ABSTRACT

Certain embodiments described herein are directed to composite materials comprising untwisted fibers. In some embodiments, the article can include a core layer comprising a thermoplastic polymer and reinforcing fibers. In other embodiments, untwisted fibers can be disposed on the core layer. In certain examples, the article is effective to provide a Class A finish when painted.

21 Claims, 5 Drawing Sheets

(51) Int. Cl.
    *B32B 5/26* (2006.01)
    *B32B 27/32* (2006.01)
    *B32B 5/02* (2006.01)
    *B32B 5/22* (2006.01)
    *B32B 27/08* (2006.01)
    *B32B 27/12* (2006.01)
    *B32B 27/18* (2006.01)
    *B32B 27/28* (2006.01)
    *B32B 27/30* (2006.01)
    *B32B 27/34* (2006.01)
    *B32B 27/36* (2006.01)
    *B32B 27/40* (2006.01)
    *B32B 27/42* (2006.01)

(52) U.S. Cl.
CPC .............. *B32B 17/02* (2013.01); *B32B 27/08* (2013.01); *B32B 27/12* (2013.01); *B32B 27/18* (2013.01); *B32B 27/28* (2013.01); *B32B 27/281* (2013.01); *B32B 27/285* (2013.01); *B32B 27/288* (2013.01); *B32B 27/302* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01); *B32B 2260/021* (2013.01); *B32B 2260/046* (2013.01); *B32B 2262/02* (2013.01); *B32B 2262/06* (2013.01); *B32B 2262/08* (2013.01); *B32B 2262/10* (2013.01); *B32B 2262/101* (2013.01); *B32B 2262/103* (2013.01); *B32B 2262/105* (2013.01); *B32B 2262/106* (2013.01); *B32B 2270/00* (2013.01); *B32B 2307/538* (2013.01); *B32B 2307/72* (2013.01); *B32B 2419/00* (2013.01); *B32B 2605/00* (2013.01); *Y10T 428/24124* (2015.01); *Y10T 428/24132* (2015.01); *Y10T 428/249952* (2015.04)

(58) Field of Classification Search
CPC ..... Y10T 428/24124; Y10T 428/24132; Y10T 428/249952
USPC ................... 428/105, 113–114, 298.1, 295.4
See application file for complete search history.

(56) References Cited

U.S. PATENT DOCUMENTS

| | | |
|---|---|---|
| 4,793,802 A | 12/1988 | Chilva |
| 4,802,843 A | 2/1989 | Chilva |
| 4,820,568 A * | 4/1989 | Harpell et al. ................ 428/113 |
| 4,950,532 A | 8/1990 | Das |
| 5,348,798 A | 9/1994 | Berghuis |
| 5,525,180 A * | 6/1996 | Paul, Jr. ................. D01F 11/12 156/155 |
| 5,643,989 A | 7/1997 | Van De Grampel |
| 6,286,879 B1 | 9/2001 | Haque |
| 7,157,034 B2 | 1/2007 | Bristow |
| 7,244,501 B2 | 7/2007 | Raghavendran |
| 7,255,391 B2 | 8/2007 | Bristow |
| 7,318,498 B2 | 1/2008 | Woodman |
| 7,431,980 B2 | 10/2008 | Woodman |
| 7,482,048 B2 | 1/2009 | Boutghrit |
| 7,682,697 B2 | 5/2010 | Raghavendran |
| 7,759,267 B2 | 7/2010 | Conover |
| 7,972,685 B2 | 7/2011 | Raghavendran |
| 8,568,853 B2 | 10/2013 | Raghavendran |
| RE44,893 E | 5/2014 | Raghavendran |
| 8,920,915 B2 | 12/2014 | Kunal |
| 2003/0036325 A1 * | 2/2003 | Schneider ................ D03D 9/00 442/208 |
| 2004/0231915 A1 | 11/2004 | Thompson |
| 2005/0215698 A1 | 9/2005 | Raghavendran |
| 2007/0202314 A1 * | 8/2007 | Youn et al. ................. 428/297.4 |
| 2007/0269645 A1 * | 11/2007 | Raghavendran ......... B32B 5/28 428/292.1 |
| 2008/0008869 A1 | 1/2008 | Good |
| 2008/0176088 A1 * | 7/2008 | Elia ..................... B29C 45/0013 428/454 |
| 2009/0155522 A1 | 6/2009 | Raghavendran |
| 2010/0021718 A1 * | 1/2010 | Vos ........................... B32B 5/26 428/315.9 |
| 2013/0101822 A1 | 4/2013 | Kumar |

OTHER PUBLICATIONS

The Complete Textile Glossary.*
Extended European Search Report for EP13854776 dated Nov. 18, 2015.
Extended European Search Report for EP13860055 dated Jun. 16, 2016.

* cited by examiner

ARTICLES INCLUDING UNTWISTED FIBERS AND METHODS OF USING THEM

PRIORITY APPLICATIONS

This application claims priority to each of U.S. Provisional Application No. 61/734,715 filed on Dec. 7, 2012 and U.S. Provisional Application No. 61/782,129 filed on Mar. 14, 2013, the entire disclosure of each of which is hereby incorporated herein by reference.

TECHNOLOGICAL FIELD

This application is related to articles that include at least one layer comprising untwisted fibers. In certain embodiments, the articles can include a thermoplastic core layer and a layer comprising untwisted glass fibers disposed on the thermoplastic core layer.

BACKGROUND

Articles for automotive and construction materials applications typically are designed to meet a number of competing and stringent performance specifications.

SUMMARY

In one aspect, a thermoplastic composite article comprising a fiber reinforced thermoplastic polymer core layer comprising reinforcing fibers and a thermoplastic polymer and a surface layer disposed on the core layer and comprising a plurality of untwisted fibers is provided.

In certain embodiments, the plurality of untwisted fibers comprise untwisted glass fibers. In certain instances, substantially all of the fibers present in the core layer are untwisted fibers. In some configurations, substantially all of the fibers present in the surface layer are untwisted fibers. In other embodiments, fibers in the surface layer disposed on the core layer consist essentially of untwisted glass fibers. In additional embodiments, fibers in the surface layer disposed on the core layer consist of untwisted glass fibers. In other examples, the core layer comprises a density of about 0.1 gm/cm$^3$ to about 1.8 gm/cm$^3$. In some examples, the core layer a porosity between about 20% to about 80% by volume of the core layer. If desired, the final formed article may be fully consolidated after processing, e.g., after a molding operation or consolidation operation the core layer and/or the final article may be fully consolidated or substantially void free. In certain embodiments, the thermoplastic polymer of the core layer comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

In certain examples, the reinforcing fibers of the core layer comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof. In some embodiments, the plurality of untwisted fibers of the surface layer comprise one or more of untwisted carbon fibers, untwisted graphite fibers, untwisted synthetic organic fibers, untwisted inorganic fibers, untwisted natural fibers, untwisted mineral fibers, untwisted metal fibers, untwisted metalized inorganic fibers, untwisted metalized synthetic fibers, untwisted ceramic fibers, or combinations thereof. In certain examples, the plurality of untwisted fibers comprises untwisted glass fibers and one or more of untwisted carbon fibers, untwisted graphite fibers, untwisted synthetic organic fibers, untwisted inorganic fibers, untwisted natural fibers, untwisted mineral fibers, untwisted metal fibers, untwisted metalized inorganic fibers, untwisted metalized synthetic fibers, untwisted ceramic fibers, or combinations thereof. In some examples, the plurality of untwisted fibers comprise untwisted glass fibers and the thermoplastic resin comprises polypropylene.

In some embodiments, the reinforcing fibers of the core layer comprise untwisted fibers. It will be recognized by the person of ordinary skill in the art, given the benefit of this disclosure, that chopping of untwisted fibers can provide a similar end form of fibers as chopping of twisted fibers. In additional embodiments, the untwisted fibers of the surface layer disposed on the core layer and the untwisted fibers of the core layer comprises at least one common type of untwisted fibers. In some examples, the untwisted fibers in the core layer are oriented in a similar direction as an orientation of the untwisted fibers in the surface layer disposed on the core layer. In additional examples, the untwisted fibers in the core layer are oriented in a different direction as an orientation of the untwisted fibers in the surface layer disposed on the core layer. In some embodiments, the surface layer disposed on the core layer comprises untwisted fibers oriented orthogonal to each other in the surface layer. In other embodiments, the surface layer disposed on the core layer further comprises twisted fibers. In some embodiments, the twisted fibers are oriented substantially parallel to the machine direction and the untwisted fibers are oriented about ninety degrees from the machine direction. In other embodiments, the untwisted fibers are oriented substantially parallel to the machine direction and the twisted fibers are oriented about ninety degrees from the machine direction. In additional embodiments, the surface comprises a wave scan number of at least 4.

In some embodiments, the articles can include an additional layer disposed on an opposite surface of the core layer. In certain examples, the additional layer comprises a plurality of twisted fibers. In other examples, the article can include at least one paint layer disposed on the layer comprising the untwisted fibers. In some examples, the article can include at least one primer layer disposed on the layer comprising the untwisted fibers. In other examples, the article can include a paint layer on the primer layer. In other embodiments, the additional layer comprises a plurality of untwisted fibers. In some examples, the layer comprising the untwisted fibers comprise untwisted fibers arranged in a cross direction and a machine direction, in which the cross direction untwisted fibers are adjacent to the core layer and in which the additional layer comprising the twisted fibers comprise fibers in the machine direction and the cross direction, in which the cross direction twisted fibers are adjacent to the core layer. In other examples, the layer comprising the untwisted fibers comprise untwisted fibers arranged in a cross direction and a machine direction, in which the cross direction untwisted fibers are adjacent to the core layer and in which the additional layer comprising the twisted fibers comprise fibers in the machine direction and the cross direction, in which the machine direction twisted fibers are adjacent to the core layer. In some embodiments, the layer comprising the untwisted fibers comprise untwisted fibers arranged in a cross direction and a machine direction, in which the machine direction untwisted fibers are adjacent to the core layer and in which the additional layer comprising the twisted fibers comprise fibers in the machine direction and the cross direction, in which the cross direction twisted fibers are adjacent to the core layer. In other embodiments, the layer comprising the untwisted fibers comprise untwisted fibers arranged in a cross direction and a machine direction, in which the machine direction untwisted fibers are adjacent to the core layer and in which the additional layer comprising the twisted fibers comprise fibers in the machine direction and the cross direction, in which the machine direction twisted fibers are adjacent to the core layer. In additional embodiments, the layer comprising the untwisted fibers comprise untwisted fibers arranged in a cross direction and a machine direction, in which the cross direction untwisted fibers are adjacent to the core layer and in which the additional layer comprising the untwisted fibers comprise fibers in the machine direction and the cross direction, in which the cross direction untwisted fibers of the additional layer are adjacent to the core layer. In further embodiments, the layer comprising the untwisted fibers comprise untwisted fibers arranged in a cross direction and a machine direction, in which the cross direction untwisted fibers are adjacent to the core layer and in which the additional layer comprising the untwisted fibers comprise fibers in the machine direction and the cross direction, in which the machine direction untwisted fibers of the additional layer are adjacent to the core layer. In some embodiments, the layer comprising the untwisted fibers comprise untwisted fibers arranged in a cross direction and a machine direction, in which the machine direction untwisted fibers are adjacent to the core layer and in which the additional layer comprising the untwisted fibers comprise fibers in the machine direction and the cross direction, in which the cross direction untwisted fibers of the additional layer are adjacent to the core layer. In additional embodiments, the layer comprising the untwisted fibers comprise untwisted fibers arranged in a cross direction and a machine direction, in which the machine direction untwisted fibers are adjacent to the core layer and in which the additional layer comprising the untwisted fibers comprise fibers in the machine direction and the cross direction, in which the machine direction untwisted fibers of the additional layer are adjacent to the core layer.

In certain embodiments, the article can include a plurality of twisted fibers in the additional layer. In other embodiments, the plurality of twisted fibers of the additional layer are adjacent to the core layer. In some examples, the plurality of untwisted fibers of the additional layer are adjacent to the core layer. In additional examples, the article can include a plurality of twisted fibers in the surface layer disposed on the core layer. In some examples, the plurality of twisted fibers of the surface layer are adjacent to the core layer. In other embodiments, the plurality of untwisted fibers of the additional layer are adjacent to the core layer. In some examples, the wave scan number of the surface comprising the untwisted fibers is at least 4

In another aspect, a composite article comprising a fiber reinforced thermoplastic polymer core layer comprising a thermoplastic polymer and reinforcing fibers disposed in the thermoplastic polymer, and a single layer disposed on the core layer, the single layer comprising a plurality of untwisted fibers, in which the plurality of untwisted fibers are oriented in a cross direction and a direction other than the cross direction, in which the untwisted fibers oriented in the cross direction are adjacent to the core layer is described. In some configurations, substantially all of the fibers present in the single layer are untwisted fibers.

In certain embodiments, the direction other than the cross direction is about ninety degrees relative to the cross direction. In some embodiments, the thermoplastic polymer comprises polypropylene and the untwisted fibers comprise untwisted glass fibers. In certain examples, the thermoplastic polymer of the core layer comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. In some examples, the reinforcing fibers comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof. In certain embodiments, the reinforcing fibers comprise untwisted fibers. In certain examples, fibers in the single layer consist essentially of untwisted glass fibers. In some examples, fibers in the single layer consist of untwisted glass fibers.

In certain embodiments, the article can include twisted fibers in the single layer. In some examples, the twisted fibers are adjacent to the core layer and the untwisted fibers are on an exterior surface of the single layer. In additional examples, the twisted and untwisted fibers are sandwiched in the single layer with untwisted fibers adjacent to the core layer and present on an exterior surface of the single layer. In certain examples, the article can include an additional layer disposed on the core layer opposite the surface where the single layer is disposed. In some embodiments, the additional layer comprises twisted fibers. In certain examples, the fibers of the additional layer consist essentially of the twisted fibers. In other examples, the fibers of the additional layer consist of the twisted fibers. In some examples, the additional layer comprises untwisted fibers. In certain embodiments, the article can include a primer layer on the single layer. In other embodiments, the article can include a paint layer on the primer layer. In some examples, a paint layer can be disposed on the single layer without the use of a primer layer. In certain examples, the article can include an additional layer disposed on the single layer.

In another aspect, a method comprising adding reinforcing fibers and a thermoplastic polymer to an agitated liquid-containing foam to form a dispersed mixture of the thermoplastic polymer and reinforcing fibers, depositing the dispersed mixture of reinforcing fibers and polymer onto a forming support element, evacuating the liquid to form a web, heating the web above the softening temperature of the polymer resin, compressing the web to a predetermined thickness to form a polymer core layer, and disposing untwisted glass fibers on the polymer core layer to provide an article is provided.

In certain examples, the method can include compressing the article. In other examples, the method can include compressing the article using a set of rollers. In additional examples, the method can include compressing the article at an effective pressure to fully consolidate the article. In other embodiments, the method can include selecting the untwisted fibers to be untwisted glass fibers. In some examples, the method can include disposing fibers on an opposite surface of the polymer core layer where the untwisted fibers are disposed. In certain embodiments, the method can include selecting the fibers disposed an on opposite surface to be twisted glass fibers. In certain examples, the method can include selecting the fibers disposed an on opposite surface to be untwisted glass fibers. In other examples, the method can include disposing a decorative skin on the untwisted fibers disposed on the core layer. In additional examples, the method can include configuring the surface to comprise a wave scan number of at least 4.

In an additional aspect, a method comprising adding reinforcing fibers and a thermoplastic polymer to an agitated liquid-containing foam to form a dispersed mixture of the thermoplastic polymer and reinforcing fibers, depositing the dispersed mixture of reinforcing fibers and polymer onto a forming support element, evacuating the liquid to form a web, heating the web above the softening temperature of the polymer resin, compressing the web to a predetermined thickness to form a polymer core layer, and disposing a layer of material comprising untwisted fibers on the polymer core layer to provide an article is disclosed.

In certain embodiments, the method can include compressing the article. In other embodiments, the method can include compressing the article using a set of rollers. In some embodiments, the method can include compressing the article at an effective pressure to fully consolidate the article. In additional embodiments, the method can include selecting the untwisted fibers to be untwisted glass fibers. In some examples, the method can include disposing a layer comprising fibers on an opposite surface of the polymer core layer where the layer comprising the untwisted fibers is disposed. In other examples, the method can include selecting the layer disposed an on opposite surface to comprise twisted glass fibers. In certain examples, the method can include selecting the layer disposed an on opposite surface to comprise untwisted glass fibers. In other examples, the method can include disposing a decorative skin on the layer comprising the untwisted fibers disposed on the core layer. In additional examples, the method can include configuring the layer with the untwisted fibers to comprise a surface wave scan number of at least 4.

In another aspect, a method of facilitating use of a vehicle part effective to provide a Class A finish upon painting of the vehicle part comprising providing a thermoplastic composite article comprising a fiber reinforced thermoplastic polymer core layer comprising reinforcing fibers and a thermoplastic polymer, and a layer disposed on the core layer and comprising a plurality of untwisted fibers is described.

In certain embodiments, the method can include configuring the vehicle part to be a hood of vehicle. In other embodiments, the method can include configuring the vehicle part to be an exterior side panel of a vehicle. In further embodiments, the method can include configuring the vehicle part to be a roof of a vehicle, e.g., an entire roof or some portion thereof. In additional embodiments, the method can include configuring the untwisted fibers to comprise untwisted glass fibers. In some examples, the method can include configuring the untwisted fibers to consist essentially of untwisted glass fibers.

In an additional aspect, a method of facilitating use of a vehicle part effective to provide a Class A finish upon painting of the vehicle part, the method comprising providing composite article comprising a fiber reinforced thermoplastic polymer core layer comprising a thermoplastic polymer and reinforcing fibers disposed in the thermoplastic polymer, and a single layer disposed on the core layer, the single layer comprising a plurality of untwisted fibers, in which the plurality of untwisted fibers are oriented in a cross direction and a direction other than the cross direction, in which the untwisted fibers oriented in the cross direction are adjacent to the core layer is provided.

In certain embodiments, the method can include configuring the vehicle part to be a hood of vehicle. In further embodiments, the method can include configuring the vehicle part to be a roof of a vehicle, e.g., an entire roof or some portion thereof. In other embodiments, the method can include configuring the vehicle part to be an exterior side panel of a vehicle. In some embodiments, the method can include configuring the untwisted fibers in the direction of than the cross direction to comprise untwisted glass fibers. In certain examples, the method can include configuring the untwisted fibers in the direction other than the cross direction to consist essentially of untwisted glass fibers.

The articles described herein can also include colorants, dyes, pigments, or other materials if desired.

Additional features, aspect, examples and embodiments are described in more detail below.

BRIEF DESCRIPTION OF THE FIGURES

Certain embodiments are described with reference to the accompanying figures in which.

Figure 1:
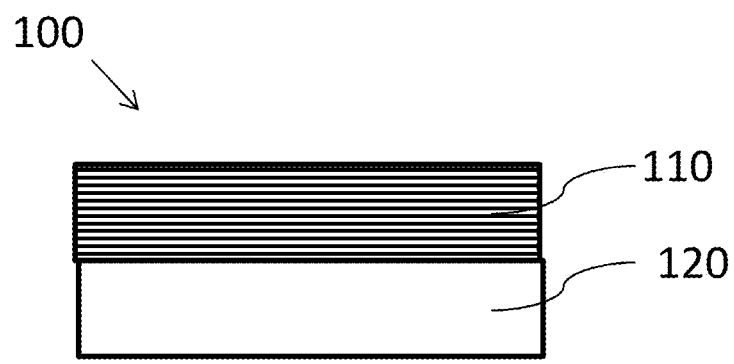
FIG. 1 is a side view of an article comprising a core layer and a surface layer, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar material, if desired.

DETAILED DESCRIPTION

Certain embodiments are described below with reference to singular and plural terms in order to provide a user friendly description of the technology disclosed herein. These terms are used for convenience purposes only and are not intended to limit the articles, composites and other subject matter as including or excluding certain features unless otherwise noted as being present in a particular embodiment described herein.

In certain embodiments, the various layers of the articles described herein can include one or more different fiber types which may include natural fibers, synthetic fibers, discontinuous fibers, chopped fibers or combinations thereof. Where fibers are present as untwisted fibers, the untwisted fibers are generally characterized as a plurality of continuous fibers that do not intersect or overlap one another with direct contact of the fibers, but different untwisted fibers may overly in each other in the x-y dimension or generally be positioned in the same x-y plane. Where untwisted fibers are present on a surface layer, the untwisted fibers can be present at an effective depth to provide a smoother surface compared to the surface smoothness present where twisted fibers of the same general composition and type are at the surface. If desired, untwisted fibers can be present at an effective surface depth to provide the smooth surface, and twisted fibers may lie or be positioned underneath the untwisted fibers. In some configurations, where untwisted fibers are present in a core layer, substantially all of the fibers in the core layer can be untwisted fibers, e.g., 95%, 96%, 95%, 98% or 99% by weight or more of the fibers in the core layer may be untwisted fibers. In certain configurations, where untwisted fibers are present in a surface layer or other layer disposed on a core layer, substantially all of the fibers in the surface/other layer can be untwisted fibers, e.g., 95%, 96%, 95%, 98% or 99% by weight or more of the fibers in the surface/other layer may be untwisted fibers.

In certain embodiments, the articles described herein can include a single layer or tape on one surface of a core layer or a single layer or tape on two or more surfaces of the core layer, e.g., top and bottom planar surfaces of a core layer. Where untwisted fibers are present in the article, they can be present in one layer or tape, both layers or tapes or may be present in multiple directions within a single layer of the tape, e.g., untwisted fibers can be present in a 0/90 orientation to each other as stacked untwisted fibers within a single layer. In some embodiments, all fibers in the surface layers of the articles may be untwisted fibers, whereas in other examples only fibers at the outer portion of the surface may be untwisted. For example, a surface layer may comprises chopped fibers adjacent to and/or in a core layer and may also include untwisted continuous fibers adjacent or near a surface that will receive a primer, paint or other finish. In some examples, the articles described herein can include a core layer comprising chopped fibers, e.g., natural or synthetic fibers, and a layer disposed on each planar surface of the core layer. The layers disposed on the core layer may be the same or may be different. In some embodiments, each layer disposed on the core comprises a 0/90 arrangement of untwisted fibers. The 0 degree fibers may be positioned adjacent to the core layer or the 90 degree fibers may be positioned adjacent to the core layer. In one embodiment, one layer comprises 0 degree fibers adjacent to the core layer and the other layer comprises 90 degree fibers adjacent to the core layer. In other embodiments, either both the 0 degree fibers or the ninety degree fibers in the different layers are adjacent to the core layer.

While the presence of untwisted fibers can increase the surface smoothness, it may be desirable to sand or smooth the surface prior to applying a final finish or a primer. Suitable sanding methods and techniques will be readily selected by the person of ordinary skill in the In certain embodiments, the articles described herein can provide a Class A capable finish that is effective to receive a primer, paint or both and provide a suitable surface quality for use on exterior parts of vehicles. The term "Class A" is generally understood in the art and, without wishing to be bound by any particular scientific theory, refers to a painted surface, e.g., a body panel, that is relatively smooth with fewer peaks and valleys. Class A surfaces generally have distinct images and gloss levels under controlled lighting conditions. While a Class A surface may be determined on visual observation, in some embodiments the curvature of the surface can be measured using one or more suitable techniques such as a surface wave scan using a laser surface analyzer or a reflected image analyzer. For example, a Class A surface is generally expected to have a continuous curvature in surface so that each point along a common line has a substantially similar radius of curvature. In other embodiments, the waviness of the surface can be measured using short-term waviness of a surface as a function of wavelength. Illustrative suitable instruments are available from BYK-Gardner GmbH (Columbia, Md. and Geretsried, Germany) and Ashland Performance Materials (Dublin, Ohio).

In some embodiments, the articles described herein can include one or more surface layers of untwisted fibers to enhance surface continuity to provide a Class A surface once primed and/or painted. In certain examples, typical fibers used in thermoplastic composite articles are twisted due to production techniques. By including a layer comprising untwisted fibers on an exterior surface, the surface properties can generally be improved. While untwisted fibers may be present on a surface in certain embodiments, the articles described herein can still include one or more layers comprising twisted fibers. For example, the article can include a first layer comprising twisted fibers and a second layer comprising untwisted fibers, which may contain twisted fibers as well.

In certain examples, the articles described herein can include a surface layer that includes fibers that consist essentially of untwisted fibers, e.g., about 98% or more by weight of the fibers present in the surface layer are untwisted fibers. In other embodiments, the surface layer can include fibers that consist of untwisted fibers, e.g., greater than 99% by weight of the fibers are untwisted fibers. In embodiments where the surface layer consists essentially of or consists of untwisted fibers, other non-fiber components may also be present including, but not limited to, binders, thermoplastic polymers, colorants, dyes, adhesives or the like.

In certain embodiments, the surface layer comprising the untwisted fibers can be disposed on a core layer as shown in FIG. 1. The article 100 includes a surface layer 110 comprising untwisted fibers disposed on a core layer 120. In some examples, the surface layer 110 can be coupled to the core layer 120. In some embodiments, the surface layer 110 is coupled to the core layer 120 by heating one or both of the surface layer 110 or the core layer 120 to their softening or melting points to permit bonding or adherence of the layers 110, 120 to each other. In other examples, the core layer 120 can be adhered to the surface layer 110 using one or more adhesives, glues or other suitable materials. In other configurations, the different layers 110, 120 can be ultrasonically welded to each other and then passed through one or more sets of rollers to laminate or press the surface layer 110 to the core layer 120. In the illustration shown in FIG. 1, the untwisted fibers are shown as arranged in the machine direction, e.g., the direction which the article moves down the processing equipment. In other embodiments, however, the untwisted fibers can be oriented in the cross direction, e.g., a direction substantially perpendicular to the machine direction, or in any direction between the machine direction and the cross direction, e.g., in any direction between 0 degrees (machine direction) and ninety degrees (cross direction).

In some examples, the untwisted fibers present in the surface layer 110 need not all be oriented in the same general direction. For example, some fibers may be oriented in a cross direction and other fibers may be oriented in the machine direction. Where untwisted fibers are present in different orientations, the untwisted fibers may be present in individual layers within the surface layer. For example, a first layer of untwisted fibers oriented in the cross direction can be adjacent to the core layer, and a second layer of untwisted fibers oriented in the machine direction can reside on the exterior surface of the article. There may be no discernible interface between the various oriented fibers such that the fibers appear to be present in a single layer.

In certain embodiments, the exact nature, length and composition of the fibers can vary and all the fibers present in the article are not necessarily the same type, length or composition. In some embodiments, the untwisted fibers can include one or more of untwisted glass fibers, untwisted carbon fibers, untwisted graphite fibers, untwisted synthetic organic fibers, untwisted inorganic fibers, untwisted natural fibers, untwisted mineral fibers, untwisted metal fibers, untwisted metalized inorganic fibers, untwisted metalized synthetic fibers, untwisted ceramic fibers, or combinations thereof. In other embodiments, the untwisted fibers may be untwisted nylon fibers, untwisted polyester fibers, untwisted hemp fibers, untwisted sisal fibers, untwisted jute fibers, untwisted flax fibers, untwisted coir, fibers untwisted kenaf fibers, untwisted cellulosic fibers, untwisted basalt fibers, untwisted mineral wool (e.g., rock or slag wool) fibers, untwisted wollastonite fibers, untwisted alumina fiber, untwisted silica fibers, and the like, or mixtures thereof, untwisted ceramic fibers, untwisted yarn fibers, or mixtures thereof. In some embodiments, the untwisted fibers can be chemically treated prior to use to provide desired functional groups or to impart other physical properties to the fibers. In other embodiments, the untwisted fibers may be chemically treated after being disposed on the core layer.

In certain embodiments, the length and dimensions of the untwisted fibers may vary from article to article and illustrative dimensions lengths include, but are not limited to, untwisted fibers comprising a diameter of greater than about 5 microns, more particularly from about 5 microns to about 22 microns, and a length of from about 5 mm to about 200 mm; more particularly, the untwisted fiber diameter may be from about 10 microns to about 22 microns and the fiber length may be from about 5 mm to about 75 mm. In certain embodiments, the untwisted fibers may be continuous fibers, e.g., untwisted, continuous natural fibers or untwisted, continuous synthetic fibers, that include the specified dimensions noted herein, e.g., continuous fibers with a diameter of greater than about 5 microns, more particularly from about 5 microns to about 22 microns, and a length of from about 5 mm to about 200 mm; more particularly, the untwisted continuous fiber diameter may be from about 10 microns to about 22 microns and the fiber length may be from about 5 mm to about 75 mm. In certain embodiments, continuous fibers can be distinguished from discontinuous fibers in that continuous fibers can be oriented in specific and/or controlled direction or orientation, whereas discontinuous fibers generally have an isotropic or random arrangement. In the articles described herein, either discontinuous or continuous fibers can be used in the various components. If it is desired to increase overall strength in the fiber direction, then it may be desirable to use continuous fibers. Fibers that are twisted generally comprise an irregular shape or pattern which can result from twisting of the fibers around a spool or creel. As twisted fibers are used, the memory of the twisted fibers may remain, which can result in an irregular pattern or shape being provided by the twisted fibers. For example, when twisted fibers are added to a thermoplastic material, the irregular pattern or shape of the twisted fibers may result in irregularities or different fiber depths from the article surface at different areas of the fibers. In some embodiments, untwisted fibers can be combined with a thermoplastic material such that the depth from the surface of the article to the fibers may be substantially the same along the entire length of the planar surface of the article. For example, the depth from the article surface to the fibers may vary no more than about 5% or about 10% along the planar surface of the article when untwisted fibers are present. In other embodiments, for a selected length along the surface of the article, e.g., about 50-200 mm or more, the depth from the surface of the article to the fibers can be substantially the same.

In some examples, the surface layer may include both twisted and untwisted glass fibers. In some configurations, the untwisted glass fibers can be positioned on the exterior surface to provide enhanced surface qualities, e.g., a Class A capable surface. In other embodiments, the twisted fibers can be positioned on the exterior surface if desired. In some embodiments, the twisted and untwisted glass fibers can be homogeneously dispersed within the surface layer. For example, a solution comprising a mixture of twisted and untwisted fibers can be disposed on the core layer in an effective manner so that the resulting surface layer comprises both twisted and untwisted fibers.

In some embodiments, the surface layer can include one or more thermoplastic materials in combination with the untwisted fibers. For example, the surface layer can include untwisted fibers in combination with one or more of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof. If desired copolymers may also be used in the surface layer, e.g., copolymers of any of the illustrative thermoplastic resins described herein.

In some embodiments, the untwisted fiber loading in the surface layer may be from about 30 weight percent to about 80 weight percent, based on the weight of the surface layer, more particularly about 30 weight percent to about 70 weigh percent, based on the weight of the surface layer, for example, about 40 weight percent to about 70 weight percent, based on the weight of the surface layer, e.g., about 50-70 weight percent or about 60-70 weight percent.

In certain embodiments, the surface layer can also include other materials or agents such as colorants, dyes, clays, emollients, pigments, metals, non-metals, or other desired materials can be added to the surface layer. For example, the surface layer can include particles, powders, whiskers, fillers, binders, or other materials that can impart desired physical properties to the surface layer.

In other embodiments, substantially all of the surface layer comprises untwisted fibers such that untwisted fibers are present from the exterior surface to the interface where the surface layer couples to the core layer (or to other layers if present).

In certain embodiments, the surface layers described herein may also comprise prepreg structures formed by impregnating a thermoplastic polymer on and around untwisted fibers. Various methods of forming prepregs may be utilized, including but not limited to, solution processing, slurry processing, direct impregnation of a fiber tow with molten polymer, fiber co-mingling, sintering of thermoplastic powder into a fiber tow, and the like. In some embodiments, the prepreg may be formed separately from the core layer and the two components can be combined at a later time. In other embodiments, the surface layer may be formed onto the core layer by providing fibers and a thermoplastic polymer to the surface of the core layer.

In certain examples, the surface layers can be pre-processed or chemically treated prior to use in the composites described herein. For example, thermostabilizers, softening agents, viscosity modifiers, thickening agents, chaotropic agents, diluents or other materials can be added to the surface layers prior to their use to provide a composite article. In certain examples, a dispersing agent can be added to the materials used to produce the surface layer to assist in mixing of any binder or resin with the untwisted fibers.

In certain examples, the core layer of the articles described herein can include one or more thermoplastic polymer materials in combination with reinforcing materials such as reinforcing fibers, e.g., glass fibers or fibers of materials other than glass. In certain embodiments, the core layer may comprise, or be configured as, a composite, e.g., a thermoplastic composite such as, for example a lightweight reinforced thermoplastic (LWRT) composite, a thermoplastic composite comprising glass materials, a glass mat thermoplastic (GMT) composite or other suitable composites. For example, one such mat is prepared by HANWHA AZDEL, Inc. and sold under the trademark SUPERLITE® mat. Other composites, such as LWRT composites, are also produced by HANWHA AZDEL, Inc. Preferably, the areal density of such a composites is from about 400 grams per square meter of the composite (g/m2 or gsm) to about 4000 g/m2, although the areal density may be less than 400 g/m2 or greater than 4000 g/m2 depending on the specific application needs. In some embodiments, the upper density can be less than about 4000 g/m2.

In certain examples, the thermoplastic composite can be generally prepared using chopped fibers and a suitable thermoplastic polymer, e.g., chopped glass fibers (which may be twisted or untwisted) mixed with a suitable thermoplastic polymer. In some embodiments, the thermoplastic polymer can be one or more thermoplastic resins such as, for example polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend are can be used as the thermoplastic polymer. To produce the glass mat, the thermoplastic polymer, reinforcing materials and/or other additives can be added or metered into a dispersing foam contained in an open top mixing tank fitted with an impeller. Without wishing to be bound by any particular theory, the presence of trapped pockets of air of the foam can assist in dispersing the fibers and thermoplastic polymer. In some examples, the dispersed mixture of glass and the polymer resin can be pumped to a head-box located above a wire section of a paper machine via a distribution manifold. The foam, not the glass fiber or polymer resin, can then be removed as the dispersed mixture is provided to a moving wire screen using a vacuum, continuously producing a uniform, fibrous wet web. The wet web can be passed through a dryer at a suitable temperature to reduce moisture content and to melt or soften the polymer resin. When the hot web exits the dryer, a surface layer such as, for example, a surface layer comprising untwisted fibers may be laminated onto the web by passing the web of fiber, thermoplastic resin and surface layer comprising the untwisted fibers through the nip of a set of heated rollers. Additional layers, e.g., a non-woven and/or woven fabric layer may also be attached along with or in place of the surface layer comprising the untwisted fibers to one side or to both sides of the web to facilitate ease of handling the glass fiber-reinforced mat. In some embodiments, a first layer is laminated to the core layer and a surface layer comprising untwisted fibers is then laminated to the first layer. The composite can then be passed through tension rolls and continuously cut (guillotined) into the desired size for later forming into an end product article. Further information concerning the preparation of such thermoplastic composites, including suitable materials and processing conditions used in forming such composites, are described, for example, in U.S. Pat. Nos. 6,923,494, 4,978,489, 4,944, 843, 4,964,935, 4,734,321, 5,053,449, 4,925,615, 5,609,966 and U.S. Patent Application Publication Nos. US 2005/ 0082881, US2005/0228108, US 2005/0217932, US 2005/ 0215698, US 2005/0164023, and US 2005/0161865.

In some embodiments of preparing the article, the web and/or surface layer(s) can be heated above the softening temperature of the thermoplastic polymer resins in the core layer to substantially soften the plastic materials and is passed through one or more consolidation devices, for example calendaring rolls, a laminating machine, a double belt laminator, an indexing press, a multiple daylight press, an autoclave, and other such devices used for lamination and consolidation of sheets and fabrics so that the plastic material can flow and wet out the fibers. The gap between the consolidating elements in the consolidation devices can be set to a dimension less than that of the unconsolidated web and greater than that of the web if it were to be fully consolidated, thus allowing the web to expand and remain substantially permeable after passing through the rollers. In one embodiment, the gap can be set to a dimension about 5% to about 10% greater than that of the web if it were to be fully consolidated. A fully consolidated web means a web that is fully compressed and substantially void free. A fully consolidated web would have less than about 5% void content and have negligible open cell structure.

In certain embodiments, the core layer may be permeable and/or porous if desired. For example, the core layer may include internal voids or spaces. In some embodiments such voids and/or spaces may exist prior to processing or the final article. For example, the core layer may be porous during production of the article, and processing of the article may result in a fully consolidated article without any substantial voids or spaces. In certain embodiments, the core layer can be porous, non-porous or includes areas which are porous while comprising other areas which are non-porous. The exact porosity present in the core layer can vary depending on the intended use of the final article. In certain embodiments, the polymer core can comprise a porosity greater than 0% by volume of the polymer core, more particularly between greater than 0% to about 95% by volume of the polymer core, and still more particularly between about 30% to about 70% by volume of the polymer core. While not required, it is also possible that the overall article, which includes the polymer core, is non-porous or has a porosity within the aforementioned ranges, e.g., the porosity of the composite article may generally be greater than 0% to about 95% of the total volume of the composite article, more particularly between greater than 0% to about 95% by the total volume of the composite article, and still more particularly between about 30% to about 70% by the total volume of the composite article. In yet other examples, the core or the overall composite article may comprise a porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. If desired the porosity of the core layer or the overall composite article may be greater than 95%, e.g., may be about 96% or 97%. In certain examples, the core layer can have a density of about 0.1 gm/cm$^3$ to about 2.25 gm/cm$^3$, more particularly about 0.1 gm/cm$^3$ to about 1.8 gm/cm$^3$, and still more particularly about 0.3 gm/cm$^3$ to about 1.0 gm/cm$^3$. After processing, the core layer may have a resulting porosity of less than 5%, e.g., less than 4%, less than 3%, less than 2% or even less than 1%. In some embodiments, a fully consolidated article can be produced that has an overall void content of less than 1%, e.g., is substantially void free.

In some embodiments, the core layer may include reinforcing materials that can impart increased strength to the article. For example, a composite article that is produced can include one or more suitable types of reinforcing materials to impart a desired strength and/or mechanical properties to the composite article. Where reinforcing materials are present, they can be present in a continuous or discontinuous form, homogenously throughout the core or localized or otherwise present in larger amounts in some areas compared to other areas. In embodiments where the reinforcing materials are fibers, the fibers can be arranged parallel to each other, orthogonal to each other or present in no particular angular orientation depending on the desired properties of the core material.

Illustrative types of fibers suitable for use in the core layer include, but are not limited to, glass fibers, carbon fibers, graphite fibers, synthetic organic fibers, particularly high modulus organic fibers such as, for example, para- and meta-aramid fibers, nylon fibers, polyester fibers, or any of the resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, the fibers can be chemically treated prior to use to provide desired functional groups or to impart other physical properties to the fibers. The fiber content in the polymer core may be from about 20% to about 90%, more particularly from about 30% to about 70%, by weight of the polymer core. Typically, the fiber content of the composite article varies between about 20% to about 90% by weight, more particularly between about 40% to about 80% by weight of the composite. The particular size and/or orientation of the fibers used may depend, at least in part, on the polymer material used and/or the desired properties of the resulting composite. Suitable additional types of fibers, fiber sizes and amounts will be readily selected by the person of ordinary skill in the art, given the benefit of this disclosure. In one non-limiting illustration, fibers dispersed within a thermoplastic polymer core, forming the polymer core material of the composite, for example, generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm. Where fibers are present in the core layer, the fibers may be twisted, untwisted or both twisted and untwisted fibers can be present. In other embodiments, the fibers of the core layer can be disposed in a gradient form such that one type of fiber is present in a larger amount toward one surface than another type of fiber.

In certain embodiments where the surface layer includes untwisted fibers and the core layer includes untwisted fibers, at least one common type of fiber may be present in both the surface and core layers. For example, untwisted glass fibers may be present in both the core layer and the surface layer if desired. In some embodiments, substantially the same type of fiber is present in both the core layer and the surface layer. For example, about 95% of the fibers in each of the surface layer and the core layer may comprise the same type of fibers, e.g., untwisted fibers or untwisted glass fibers.

In certain embodiments, the fibers in the core layer can be oriented in a similar direction as an orientation of the untwisted fibers in the layer disposed on the core layer. For example, the fibers in both layers can be oriented in the machine direction or the cross direction. In other embodiments, the fibers in the core layer can be oriented in a different direction as an orientation of the untwisted fibers in the surface layer. For example, the fibers in the core layer can be oriented in the machine direction and the fibers of the surface layer can be oriented in the cross direction or in a direction other than the machine direction. In other embodiments, the fibers in the core layer can be oriented in the cross direction and the fibers of the surface layer can be oriented in the machine direction or in a direction other than the cross direction. In some embodiments where the fibers of the core layer are oriented in the same or a different direction as the untwisted fibers of the surface layer, the fibers of the core layer may comprise twisted fibers, untwisted fibers or both twisted and untwisted fibers.

In certain embodiments, the polymer core layer can include about 20% to about 80% by weight of untwisted fibers having an average length of between about 5 mm and about 200 mm, and about 20% to about 80% by weight of a wholly or substantially unconsolidated fibrous or particulate thermoplastic materials, where the weight percentages are based on the total weight of polymer core layer. In another embodiment, the polymer core layer of the composites herein includes about 30% to about 60% by weight of untwisted fibers. In some examples, fiber comprising an average length of between about 5 mm and about 25 mm are typically utilized in polymer core. Suitable untwisted fibers for use in the core layer include, but are not limited to, untwisted metal fibers, untwisted metalized inorganic fibers, untwisted metalized synthetic fibers, untwisted glass fibers, untwisted graphite fibers, untwisted carbon fibers, untwisted ceramic fibers, untwisted mineral fibers, untwisted basalt fibers, untwisted inorganic fibers, untwisted aramid fibers, untwisted kenaf fibers, untwisted jute fibers, untwisted flax fibers, untwisted hemp fibers, untwisted cellulosic fibers, untwisted sisal fibers, untwisted coir fibers, and combinations thereof. Additional suitable fibers will be readily selected by the person of ordinary skill in the art, given the benefit of this disclosure.

In certain embodiments, the core layer can include one or more additives or other materials. For example, flame retardant materials such as halogenated materials, phosphorated materials, nitrogenated materials or other suitable flame retardants can be added to the article, e.g., in the core layer, the surface layer or both or other layers. In further embodiments, smoke suppressants, oxygen scavengers, ultraviolet light inhibitors, dyes, colorants, pigments or other materials can be added to the articles, either before curing or post-curing.

Figure 2:
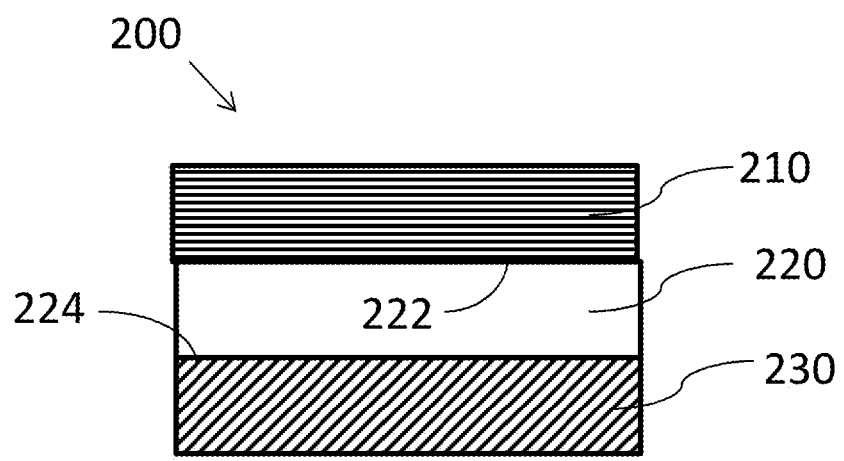
FIG. 2 is a side view of an article comprising a core layer, and two surface layers, in accordance with certain examples.

In certain embodiments, the articles described herein can include one or more additional layers disposed on an opposite surface of the core layer. Referring to FIG. 2, an article 200 comprises a surface layer 210 comprising untwisted fibers, a core layer 220 and a layer 230. The surface layer 210 is disposed on a first surface 222 of the core layer, and the layer 230 is disposed on an opposite surface 224 of the core layer 220. In some embodiments, the layer 230 may comprise a film, scrim or other type of material to impart desired properties to the article 200. If desired, the layer 230 may comprise fibers, e.g., twisted or untwisted fibers, and a thermoplastic polymer. In certain examples, the additional layer 230 may comprise a plurality of twisted fibers which can be adjacent to the core layer 220. In other examples, the additional layer 230 may comprise a plurality of untwisted fibers which can be adjacent to the core layer 220.

In certain embodiments, the layer 210 comprises untwisted fibers arranged in a cross direction and a machine direction, in which the cross direction untwisted fibers are adjacent to the core layer 220 and in which the additional layer 230 comprises fibers, e.g., twisted fibers in the machine direction and the cross direction, in which the cross direction fibers of the layer 230 are adjacent to the core layer 220. In other embodiments, the layer 210 comprises untwisted fibers arranged in a cross direction and a machine direction, in which the cross direction untwisted fibers are adjacent to the core layer 220 and in which the additional layer comprises fibers, e.g., twisted fibers, in the machine direction and the cross direction, in which the machine direction fibers of the layer 230 are adjacent to the core layer 220. In other examples, the layer 210 comprises untwisted fibers arranged in a cross direction and a machine direction, in which the machine direction untwisted fibers are adjacent to the core layer 220 and in which the additional layer 230 comprises fibers, e.g., twisted fibers, in the machine direction and the cross direction, in which the cross direction fibers of the layer 230 are adjacent to the core layer 220. In some examples, the layer 210 comprises untwisted fibers arranged in a cross direction and a machine direction, in which the machine direction untwisted fibers are adjacent to the core layer 220 and in which the additional layer 230 comprises fibers, e.g., twisted fibers, in the machine direction and the cross direction, in which the machine direction fibers of the layer 230 are adjacent to the core layer 220. In certain examples, the layer 210 comprise untwisted fibers arranged in a cross direction and a machine direction, in which the cross direction untwisted fibers are adjacent to the core layer 220 and in which the additional layer 230 comprises fibers, e.g., untwisted fibers, in the machine direction and the cross direction, in which the cross direction fibers of the additional layer 230 are adjacent to the core layer 220. In some embodiments, the layer 210 comprises untwisted fibers arranged in a cross direction and a machine direction, in which the cross direction untwisted fibers are adjacent to the core layer 220 and in which the additional layer 230 comprise fibers, e.g., untwisted, in the machine direction and the cross direction, in which the machine direction fibers of the additional layer 230 are adjacent to the core layer 220. In some examples, the layer 210 comprises untwisted fibers arranged in a cross direction and a machine direction, in which the machine direction untwisted fibers are adjacent to the core layer 220 and in which the additional layer 230 comprises fibers, e.g., untwisted fibers, in the machine direction and the cross direction, in which the cross direction untwisted fibers of the additional layer 230 are adjacent to the core layer 220. In certain examples, the layer 210 comprises untwisted fibers arranged in a cross direction and a machine direction, in which the machine direction untwisted fibers are adjacent to the core layer 220 and in which the additional layer 230 comprises fibers, e.g., untwisted fibers, in the machine direction and the cross direction, in which the machine direction fibers of the additional layer 230 are adjacent to the core layer 220.

In certain embodiments, the surface layers 110 or 210 can include a suitable primer layer disposed thereon. Illustrative primer materials include but are not limited to those primer materials commonly used in the automotive industry to paint exterior surfaces of vehicles such as cars, trucks, recreational vehicles, trains, planes and other vehicles with gasoline engines, electric engines or other means of propulsion. A suitable paint layer can be disposed on the primer layer or directly on the surface layer without the use of a primer layer if desired.

Figure 3:
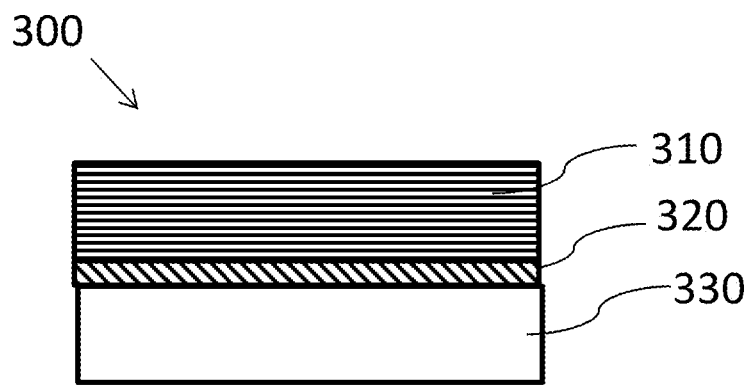
FIG. 3 is a side view of an article comprising a core layer, a surface layer and a layer between the core layer and the surface layer, in accordance with certain examples.

In certain embodiments, the articles described herein can include an additional layer between the surface layer and the core layer. Referring to FIG. 3, an article 300 comprises a surface layer 310 disposed on a layer 320 which itself is disposed on a core layer 330. The layer 320 may be a film, scrim, an adhesive layer or other suitable materials. If desired the layer 320 may include fibers, which can be twisted or can be untwisted, and a thermoplastic polymer. Where the layer 320 includes fibers, the fibers may be oriented in a similar direction as the untwisted fibers of the surface layer 310 or may be oriented in a different direction. In some embodiments, the layer 320 may include fibers oriented in multiple different directions.

Figure 4:
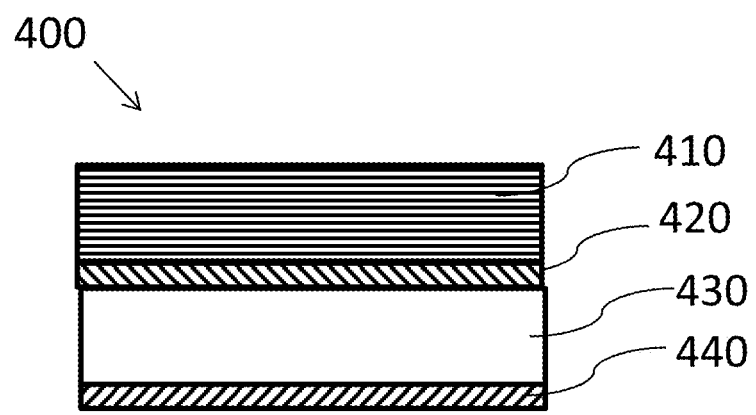
FIG. 4 is a side view of an article comprising a core layer, a first surface layer, a layer between the core layer and the first surface layer and a second surface layer on an opposite surface of the core layer, in accordance with certain examples.

In certain embodiments where a layer is present between a surface layer and a core layer, another layer may be disposed on an opposite surface of the core layer. Referring to FIG. 4, the article 400 comprises a surface layer 410 disposed on a layer 420 which itself is disposed on a core layer 430. An additional layer 440 is disposed on an opposite surface of the core layer 430. Where fibers are present in the additional layer 440, the fiber orientation of the layer 440 may be any of those discussed in reference to layer 230 of FIG. 2 or other suitable orientations that will be selected by the person of ordinary skill in the art, given the benefit of this disclosure. As described herein, the surface layer 410 can include untwisted fibers. If desired, the layer 440 may also include untwisted fibers, twisted fibers or both untwisted and twisted fibers.

Figure 5:
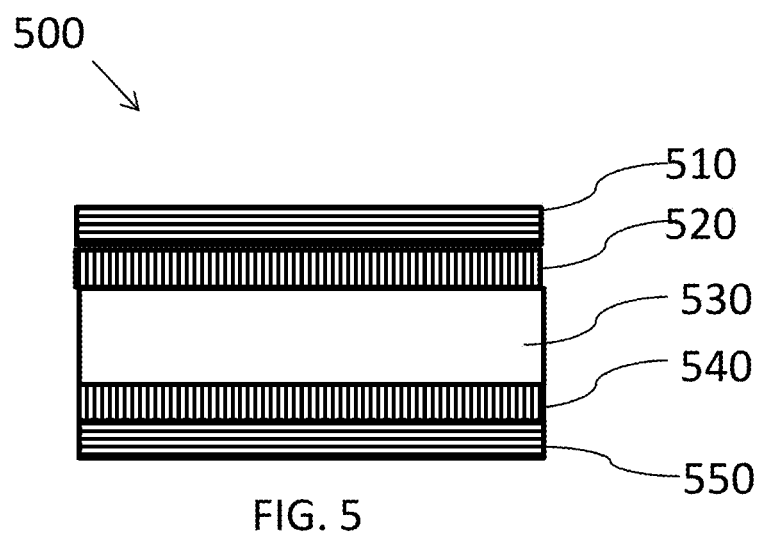
FIG. 5 is a side view of an article comprising two layers disposed on each side of a core layer, in accordance with certain examples.

In certain embodiments, the articles described herein can include two or more layers on each side of the core layer. For example and referring to FIG. 5, an article 500 comprises a surface layer 510 disposed on a layer 520, which itself is disposed on a core layer 530. On an opposite surface of the core layer 530 is a layer 540. Another layer 550 is disposed on the layer 540. In certain examples, one of the outer layers 510 and 550 comprise untwisted fibers. In some embodiments, each of the outer layers 510 and 550 may comprise untwisted fibers. In certain embodiments, one of the layer 510 and 550 comprises untwisted fibers and the other layer comprises twisted fibers. The inner layers 520 and 540 may also comprise twisted or untwisted fibers. In some embodiments, the orientation of the fibers in the inner layer 520 may be the same as the orientation of the fibers in the surface layer 510. Similarly, the orientation of the fibers in the inner layer 540 may be the same as the orientation of the fibers in the surface layer 550. In other embodiments, one or more of the inner layers 520 and 540 may have a different fiber orientation than the fiber orientation of its adjacent surface layer. For example, fibers in the layer 520 can be oriented in a cross direction and fibers in the layer 510 may be oriented in the machine direction or in a direction other than the cross direction. In some embodiments, the fibers in the layer 540 can be oriented in a cross direction and fibers in the layer 550 may be oriented in the machine direction or in a direction other than the cross direction. It will be recognized by the person of ordinary skill in the art that the fiber orientations of the various layers can be altered or substituted with other orientations and the fiber orientation of any one layer may be the same or may be different than the fiber orientation present in another layer.

In certain examples, the articles described herein can include a single surface layer disposed on a core layer. For example, a composite article can include a fiber reinforced thermoplastic polymer core layer comprising a thermoplastic polymer and reinforcing fibers disposed in the thermoplastic polymer, and a single layer disposed on the core layer and comprising a plurality of untwisted fibers, in which the plurality of untwisted fibers are oriented in a cross direction and a direction other than the cross direction, in which the untwisted fibers oriented in the cross direction are adjacent to the core layer. The single layer generally does not include any discernible interface within the layer. In some examples, the fibers of the single layer may be disposed on the core layer sequentially to provide a desired deposition type of fibers in the single layer. The disposed fiber layer can then be heated to melt the binder or thermoplastic polymer of the layer such that no discernible interface exists between the different fibers that were disposed.

In certain embodiments, the articles used herein can be used to provide a body panel suitable for receiving a primer, paint or both. Such a panel may be capable of providing a "Class A" finish as described herein. In some embodiments, the article can be configured as an exterior vehicle panel such as, for example, a bumper, a bumper cover, a hood, a fender, a door, a roof, a truck bed, side wall panels such as for recreational vehicles, cargo liners, front and/or rear pillar trim, or other vehicle parts that may be desired to be painted. The composite material can be molded into various other articles using numerous methods including, but not limited to, pressure forming, thermal forming, thermal stamping, vacuum forming, compression forming, and autoclaving. Illustrative methods are described, for example, in U.S. Pat. Nos. 6,923,494 and 5,601,679, and in DuBois and Pribble's "Plastics Mold Engineering Handbook", Fifth Edition, 1995, pages 468 to 498 and elsewhere.

In certain embodiments, the articles described herein can have a suitable surface such that a wave scan provides a wave scan number of at least 4. While the exact method used to measure the surface can vary, in some embodiments the article comprises a continuous curvature in surface so that each point along a common line has a substantially similar radius of curvature.

In certain embodiments, the composite articles described herein can be produced using numerous methods. For example, the composite may generally be prepared in various forms, such as sheets or films, as layered materials on pre-formed substrates, or in other more rigid forms depending on the particular application desired. For certain applications, the composite can be provided in sheet form and may optionally include, in addition to the surface layer comprising the untwisted fibers, one or more additional layers on one or both surfaces of such sheet. In one illustration, such additional surface or skin layers may be, for example, a film, non-woven scrim, a veil, a woven fabric, or combinations thereof. If desired, the surface layers may be air permeable and can substantially stretch and spread with the composite article during thermoforming and/or molding operations. In addition, such layers may be adhesive, such as a thermoplastic material (e.g., an ethylene acrylic acid copolymer or other such polymers) applied to the surface of the fiber-containing thermoplastic material. Generally, the areal density of the composite article, particularly when in sheet form, varies from about 150 gsm to about 4000 gsm, more particularly about 500 gsm to about 3000 gsm, e.g., about 300 gsm to about 500 gsm, or about 500 gsm to about 750 gsm or about 750 gsm to about 2500 gsm.

In certain embodiments, it may be desirable to first produce, form or pre-form a composite core, e.g., a LWRT composite core, and then apply, extrude or form untwisted fibers onto the formed core to provide the article. For example, the core of the composite can be formed as described herein, and then untwisted fibers may be applied directly to the core without the use of any binder or retaining material or the untwisted fibers may be held in a temporary form, e.g., in the form of a tape or web, to facilitate easier application of the untwisted fibers to the core. In some embodiments, the untwisted fibers can first be formed into a web of substantially flat, parallel fibers that can be fixed or held in place using a thermoplastic material. The fiber web can then be applied to the core layer as a separate layer. Heating of the composite article may result in mixing of the untwisted fibers into upper surfaces or areas of the core layer to provide an article effective to provide a Class A finish upon painting.

Certain specific examples are described below to illustrate further some of the novel aspects of the technology described herein.

Example 1

An article is produced by forming a core layer comprising chopped glass fibers and a polypropylene resin. The glass fibers and resin are added to an agitated liquid-containing foam to form a dispersed mixture of the polypropylene and reinforcing fibers. The mixture is then deposited on a forming support element such as a screen to provide a web. Liquid is evacuated from the web, and the web is then heated above the softening temperature of the polypropylene. The softened web is then compressed to a predetermined thickness to provide a core layer. The core layer may have a basis weight from about 1000 gsm to about 3000 gsm.

A tape comprising a polypropylene copolymer and untwisted glass fibers, or a polypropylene resin (melt flow index of about 100 g/10 min) and untwisted glass fibers, is disposed on the core layer. The tape may have a basis weight from about 500 gsm to about 1200 gsm. The composite article is then passed through a set of rollers to laminate the tape to the core layer and provide a sheet of material.

The sheet of material can be diced or cut into a desired size to provide boards. The boards may be molded, formed or otherwise altered to a desired shape. After forming, the part may be primed and/or painted to provide a Class A finish.

Example 2

Figure 6:
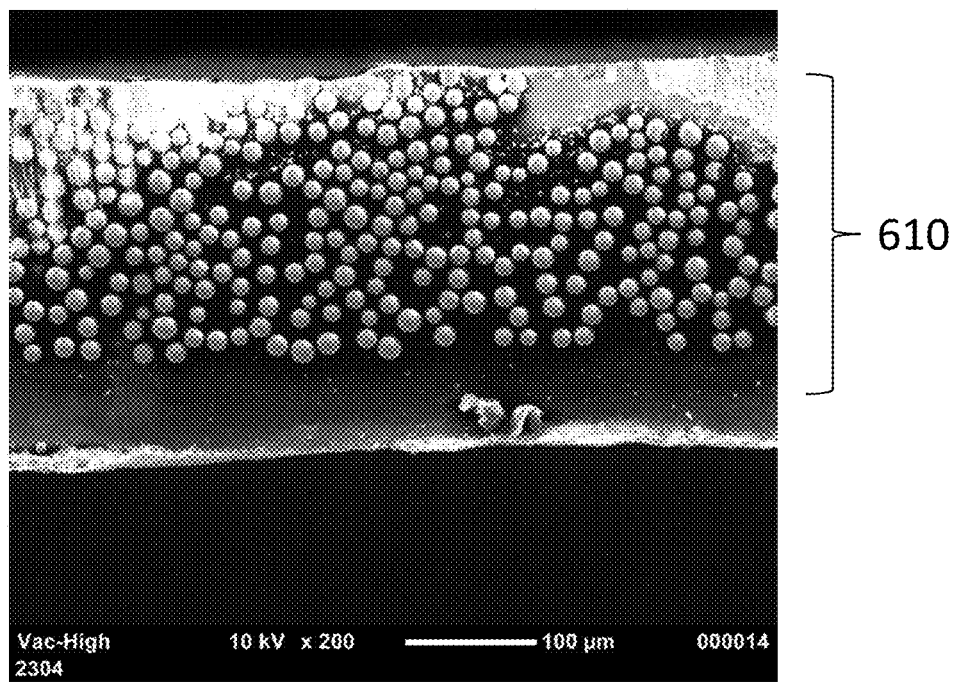
FIG. 6 is a scanning electron microscope image of a tape with untwisted fibers and a resin rich layer, in accordance with certain examples.

A scanning electron microscope image was obtained from layer of material including an outer layer of untwisted fibers. The results are shown in FIG. 6. The untwisted fibers 610 are dispersed well and more uniform than a twisted fiber (see FIG. 9 below) and generally do not overlap but may lie in the same vertical or horizontal plane.

Example 3

Figure 7:
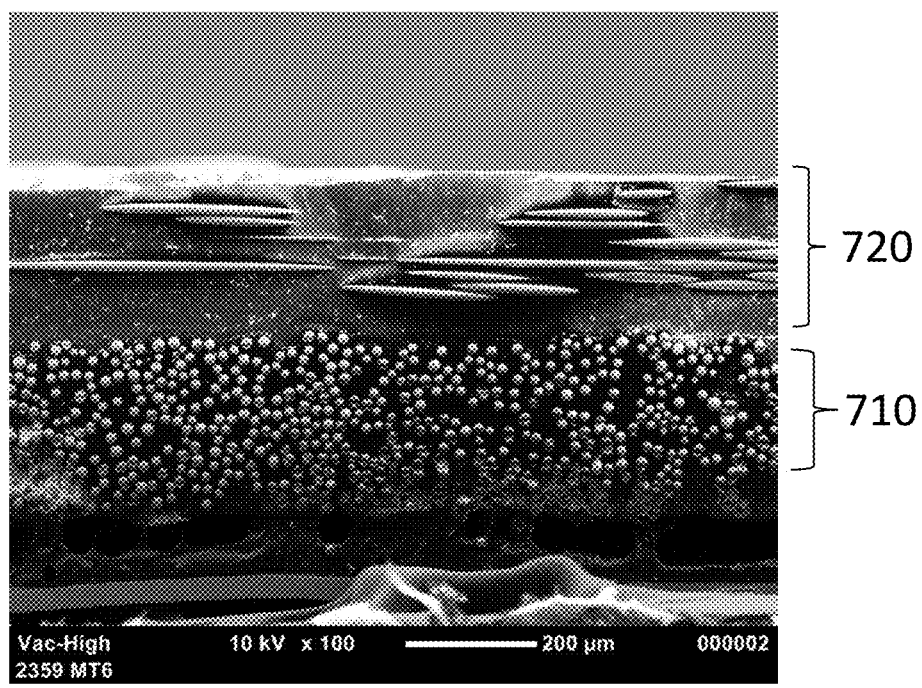
FIG. 7 is a scanning electron microscope image of an article including a bilayer tape, in which the tape comprises a 0/90 orientation of the untwisted fibers in the tape, in accordance with certain examples.

A scanning electron microscope image was obtained from a layer of material of an article including an outer layer of untwisted fibers. The results are shown in FIG. 7. The untwisted fibers are disposed in the layer in a 0/90 arrangement where the untwisted fibers 710 can be disposed on the 0 degree direction (machine direction) and the ninety degree fibers 720 can be disposed in the cross direction (or vice versa).

Example 4

Figure 8:
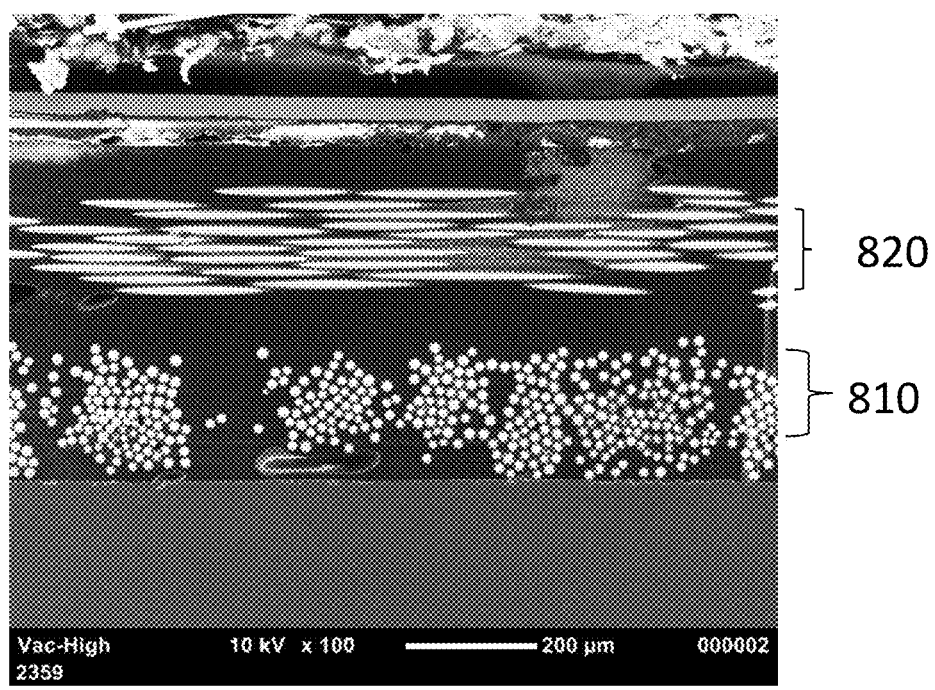
FIG. 8 is a scanning electron microscope image of an article including untwisted fibers and one resin rich layer on one side, in accordance with certain examples.

A scanning electron microscope image was obtained from a layer of material of an article including an outer layer of untwisted fibers. The results are shown in FIG. 8. The untwisted fibers are disposed in a 0/90 arrangement where the untwisted fibers 810 can be disposed on the 0 degree direction (machine direction) and the ninety degree fibers 820 can be disposed in the cross direction (or vice versa).

Example 5

Figure 9:
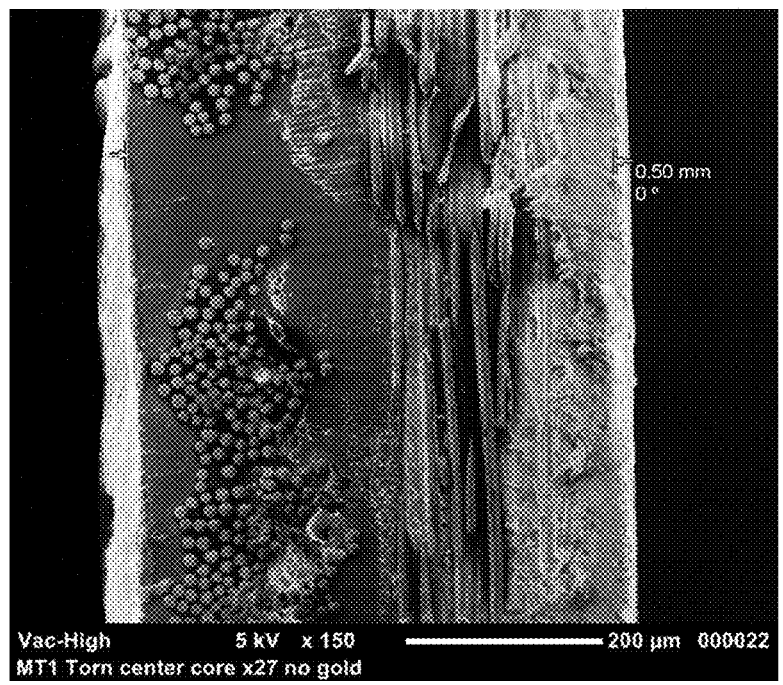
FIG. 9 is scanning electron microscope image of a conventional article including 0/90 twisted fibers, in accordance with certain examples.

For comparison purposes, an SEM image was obtained from a layer of material of an article that included twisted fibers. The results are shown in FIG. 9. The twisted fibers were present in a 0/90 orientation similar to the fiber orientation of the untwisted fibers.

Example 6

A surface wave scan was performed on primed and painted articles, using the different fibers described in Examples 2-5, that had been molded into small hoods. The results are shown in Table 1. The higher the wave scan number, the smoother the surface.

TABLE 1

| Article | Wave scan number for Painted Parts |
|---|---|
| Example 5 (twisted) | 2.8 |
| Example 4 (untwisted) | 4.67 (3.7-5.5) |
| Example 3 (untwisted) | 5.3 |

As can be seen in Table 1, the wave scan numbers are substantially higher, e.g., almost 2× higher, for the articles with the untwisted fibers compared to the articles with the twisted fibers indicating the untwisted fibers provide substantially smoother surfaces.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A thermoplastic composite article comprising:
a fiber reinforced thermoplastic polymer porous core layer comprising a web formed from discontinuous, randomly distributed reinforcing fibers and a thermoplastic polymer; and
a surface layer disposed on the core layer and comprising a plurality of individual and separate, continuous untwisted fibers that do not intersect or overlap one another.

2. The thermoplastic composite article of claim 1, in which the plurality of individual and separate, continuous untwisted fibers comprise individual and separate, untwisted glass fibers that do not intersect or overlap one another.

3. The thermoplastic composite article of claim 1, in which fibers in the surface layer disposed on the core layer consist essentially of the individual and separate, continuous untwisted glass fibers that do not intersect or overlap one another.

4. The thermoplastic composite article of claim 1, in which fibers in the surface layer disposed on the core layer consist of the individual and separate, continuous untwisted glass fibers that do not intersect or overlap one another.

5. The composite article of claim 1, in which the core layer comprises a density of about 0.1 gm/cm$^3$ to about 1.8 gm/cm$^3$.

6. The composite article of claim 1, in which the core layer is partially consolidated.

7. The composite article of claim 1, in which the thermoplastic polymer of the core layer comprises at least one of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, or copolymers or mixtures thereof.

8. The composite article of claim 1, in which the reinforcing fibers of the core layer comprise one or more of glass fibers, carbon fibers, graphite fibers, synthetic organic fibers, inorganic fibers, natural fibers, mineral fibers, metal fibers, metalized inorganic fibers, metalized synthetic fibers, ceramic fibers, or combinations thereof.

9. The composite article of claim 1, in which the plurality of untwisted fibers comprise one or more of untwisted carbon fibers, untwisted graphite fibers, untwisted synthetic organic fibers, untwisted inorganic fibers, untwisted natural fibers, untwisted mineral fibers, untwisted metal fibers, untwisted metalized inorganic fibers, untwisted metalized synthetic fibers, untwisted ceramic fibers, or combinations thereof.

10. The composite article of claim 1, in which the plurality of untwisted fibers comprises untwisted glass fibers and one or more of untwisted carbon fibers, untwisted graphite fibers, untwisted synthetic organic fibers, untwisted inorganic fibers, untwisted natural fibers, untwisted mineral fibers, untwisted metal fibers, untwisted metalized inorganic fibers, untwisted metalized synthetic fibers, untwisted ceramic fibers, or combinations thereof.

11. The composite article of claim 1, in which the plurality of untwisted fibers of the surface layer comprise untwisted glass fibers and the thermoplastic polymer comprises polypropylene.

12. The composite article of claim 1, in which the reinforcing fibers of the core layer comprise discontinuous separate untwisted fibers randomly arranged.

13. The composite article of claim 12, in which the untwisted fibers of the surface layer disposed on the core layer and the untwisted fibers of the core layer comprises at least one untwisted fiber with the same composition.

14. The composite article of claim 1, in which the surface layer disposed on the core layer further comprises additional individual and separate, untwisted fibers oriented orthogonal to each other in the surface layer.

15. The composite article of claim 14, in which the surface layer disposed on the core layer further comprises twisted fibers.

16. The composite article of claim 15, in which the twisted fibers are oriented substantially parallel to the machine direction and the additional untwisted fibers are oriented about ninety degrees from the machine direction.

17. The composite article of claim 1, in which the article has a wave scan number of at least 4.

18. The composite article of claim 1, further comprising an additional layer disposed on an opposite surface of the core layer, in which the additional layer comprises separate, continuous untwisted fibers that do not intersect or overlap one another.

19. The composite article of claim 1, in which the porous core layer comprises about 20% by weight to about 80% by weight polypropylene, in which the fibers of the core layer are glass fibers and in which the fibers of the surface layer are individual and separate, continuous untwisted glass fibers that do not intersect or overlap one another.

20. The composite article of claim 19, in which the core layer comprises a density of about 0.1 gm/cm$^3$ to about 1.8 gm/cm$^3$, a porosity between about 5% and about 95%, in which the glass fibers of the core layer comprise a length of about 5 mm to about 75 mm and a diameter of about 5 microns to about 22 microns, and in which the untwisted glass fibers of the surface layer comprise a length of about 5 mm to about 75 mm and a diameter of about 5 microns to about 22 microns.

21. The composite article of claim 1, further comprising twisted fibers in the surface layer, in which the individual and separate, untwisted fibers of the surface layer that do not intersect or overlap one another are arranged on an exterior surface of the surface layer and the twisted fibers are underneath the untwisted fibers of the surface layer.

* * * * *